United States Patent
Kraus

(10) Patent No.: US 11,382,277 B2
(45) Date of Patent: Jul. 12, 2022

(54) LARGE SQUARE BALER WITH PRE-COMPRESSION CHAMBER HAVING REMOVEABLE ACCESS PANEL

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 72 days.

(21) Appl. No.: 16/917,017

(22) Filed: Jun. 30, 2020

(65) Prior Publication Data

US 2021/0400880 A1    Dec. 30, 2021

(51) Int. Cl.
*A01F 15/10* (2006.01)
*A01F 15/04* (2006.01)

(52) U.S. Cl.
CPC .............. *A01F 15/10* (2013.01); *A01F 15/04* (2013.01); *A01F 2015/102* (2013.01)

(58) Field of Classification Search
CPC ........ A01F 15/04; A01F 15/10; A01F 15/101; A01F 2015/102; A01F 2015/107; A01F 29/10; A01F 15/042; B02C 2013/28672
USPC ............................. 100/88, 179, 188 R, 189
See application file for complete search history.

(56) References Cited

U.S. PATENT DOCUMENTS

| 4,956,967 | A | * | 9/1990 | De Busscher | A01F 12/16 100/142 |
| 9,756,790 | B2 | * | 9/2017 | Rosseel | A01F 15/101 |
| 9,907,232 | B2 | * | 3/2018 | Rosseel | A01F 15/10 |
| 10,485,182 | B2 |   | 11/2019 | Devroe et al. | |
| 2017/0105353 | A1 |   | 4/2017 | Rosseel et al. | |
| 2018/0317395 | A1 |   | 11/2018 | Devroe et al. | |
| 2020/0170192 | A1 | * | 6/2020 | Devroe | A01F 15/046 |

FOREIGN PATENT DOCUMENTS

EP    3158856 A1    4/2017

OTHER PUBLICATIONS

Extended European Search Report and Written Opinion issued in European Patent Application No. 21179210.6, dated Nov. 26, 2021, in 09 pages.

* cited by examiner

*Primary Examiner* — Jimmy T Nguyen
(74) *Attorney, Agent, or Firm* — Tucker Ellis LLP; Patrick F. Clunk

(57) ABSTRACT

A baler implement includes a lower passage wall defining a lower boundary of a pre-compression passageway. The lower passage wall includes a forward portion and an access panel. A pivotable connection interconnects the forward portion and the access panel at a lower and forward transverse edge of the access panel such that a rearward and upper transverse edge of the access panel moves vertically to provide access into the pre-compression passageway. Access is obtained from the rear of the baler implement, between the rearward transverse edge of the access panel and a bottom wall of the compression chamber, without the access panel hanging down from the compression chamber and obscuring access into the pre-compression passageway.

15 Claims, 8 Drawing Sheets

LARGE SQUARE BALER WITH PRE-COMPRESSION CHAMBER HAVING REMOVEABLE ACCESS PANEL

TECHNICAL FIELD

The disclosure generally relates to a baler implement.

BACKGROUND

Agricultural balers gather, compress, and shape crop material into a bale. There are different types of balers which create parallelepiped bales, i.e., square bales, or cylindrical bales, i.e., round bales. One exemplary baler is often referred to as a large square baler. Large square balers have been used in crop harvesting for many years, and utilize a compression system including a gearbox with a crank arm and connecting rod which are attached to a reciprocating plunger. During each rotation of the crank arm, the reciprocating plunger compresses the crop in a baling or compression chamber as the plunger moves towards the rear of the baler. The large square balers form the crop material into a bale having a parallelepiped shape.

A large square baler includes a pick-up with gathers crop material from a ground surface of the field and moves the gathered crop material into a pre-compression passageway. The crop material is collected in the pre-compression passageway until the plunger is retracted, at which time a plurality of feeder forks move the collected crop material from the pre-compression passageway, through a chamber inlet, and into the compression chamber. Certain operating and/or crop conditions may cause the pre-compression passageway to become plugged with crop material, such that the feeder forks are unable to move the crop material into the compression chamber.

SUMMARY

A baler implement is provided. The baler implement includes a pick-up that is operable to gather and move crop material. A housing extends along a central longitudinal axis between a forward end and a rearward end. The housing includes a bottom wall partially defining a compression chamber. The bottom wall defines a chamber inlet for supplying the crop material into the compression chamber. A lower passage wall defines a lower boundary of a pre-compression passageway. The pre-compression passageway interconnects the pick-up and the chamber inlet. The lower passage wall includes a forward portion and an access panel. The forward portion of the lower passage wall is positioned proximate the pick-up. The access panel is moveable between an operating position for guiding crop material from the pick-up to the chamber inlet, and an access position for providing access to the pre-compression passageway. The access panel includes a first transverse edge and a second transverse edge. The first transverse edge is positioned forward of the second transverse edge relative to the forward end of the housing. The first transverse edge is positioned vertically below the second transverse edge relative to an elevation of the bottom wall of the housing when the access panel is disposed in the operating position. A pivotable connection interconnects the forward portion and the access panel of the lower passage wall. The pivotable connection is disposed proximate the first transverse edge of the access panel, such that the second transverse edge of the access panel moves vertically relative to the elevation of the bottom wall as the access panel moves between the operating position and the access position to provide access into the pre-compression passageway. Access to the pre-compression passageway is thereby provided between the second transverse edge and the bottom wall of the housing. The access panel may thus rest on a ground surface when disposed in the access position, without hanging down and interfering with access to the pre-compression passageway, thereby providing access to the pre-compression passageway from the rear of the baler implement.

In one aspect of the disclosure, the lower passage wall includes a rearward portion that is positioned proximate the chamber inlet. The access panel is positioned between the forward portion and the rearward portion along the central longitudinal axis. The rearward portion of the lower passage wall includes a lower transverse edge positioned adjacent the second traverse edge of the access panel when the access panel is disposed in the operating position. The rearward portion further includes an upper transverse edge positioned adjacent to the bottom wall and proximate to the chamber inlet. The lower transverse edge of the rearward portion and the second transverse edge of the access panel may be disposed in interlocking engagement when the access panel is positioned in the operating position.

In one implementation of the disclosure, the second transverse edge of the access panel defines an inner lip and the lower transverse edge of the rearward portion defines an outer lip. The inner lip of the access panel is positioned inward of the outer lip of the rearward portion relative to the pre-compression passageway. As such, the outer lip of the rearward portion operates to secure the access panel in the operating position.

In one implementation of the disclosure, the upper transverse edge of the rearward portion is rotatably attached to the housing for rotational movement about a transverse axis relative to the housing. The baler implement may further include a rearward latch interconnecting the rearward portion of the lower passage wall and the housing. The rearward latch is operable to secure the rearward portion relative to the housing when the access panel is disposed in the operating position.

In one implementation of the disclosure, the rearward portion is non-moveable relative to the housing. With the rearward portion fixed in position and not moveable relative to the housing, the rearward latch is not necessary, and may be omitted.

In one aspect of the disclosure, the first transverse edge of the access panel defines an exterior lip and a rear transverse edge of the first portion defines an interior lip. The interior lip of the first portion is positioned inward of the exterior lip of the access panel, relative to the pre-compression passageway. As such, the interior lip of the first portion does not secure the position of the access panel.

In one aspect of the disclosure, the baler implement includes a forward latch positioned proximate the first transverse edge of the access panel. The forward latch interconnects the access panel and the housing. The forward latch is operable to secure the access panel to the housing when the access panel is disposed in the operating position.

In one implementation of the disclosure, the pivotable connection includes a pivot link interconnecting the pivotable connection and the access panel. A second pivotable connection may be included and positioned rearward of the pivotable connection, relative to the central longitudinal axis. The second pivotable connection is spaced rearward from the pivotable connection a link distance. The second pivotable connection interconnects the pivot link and the access panel.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
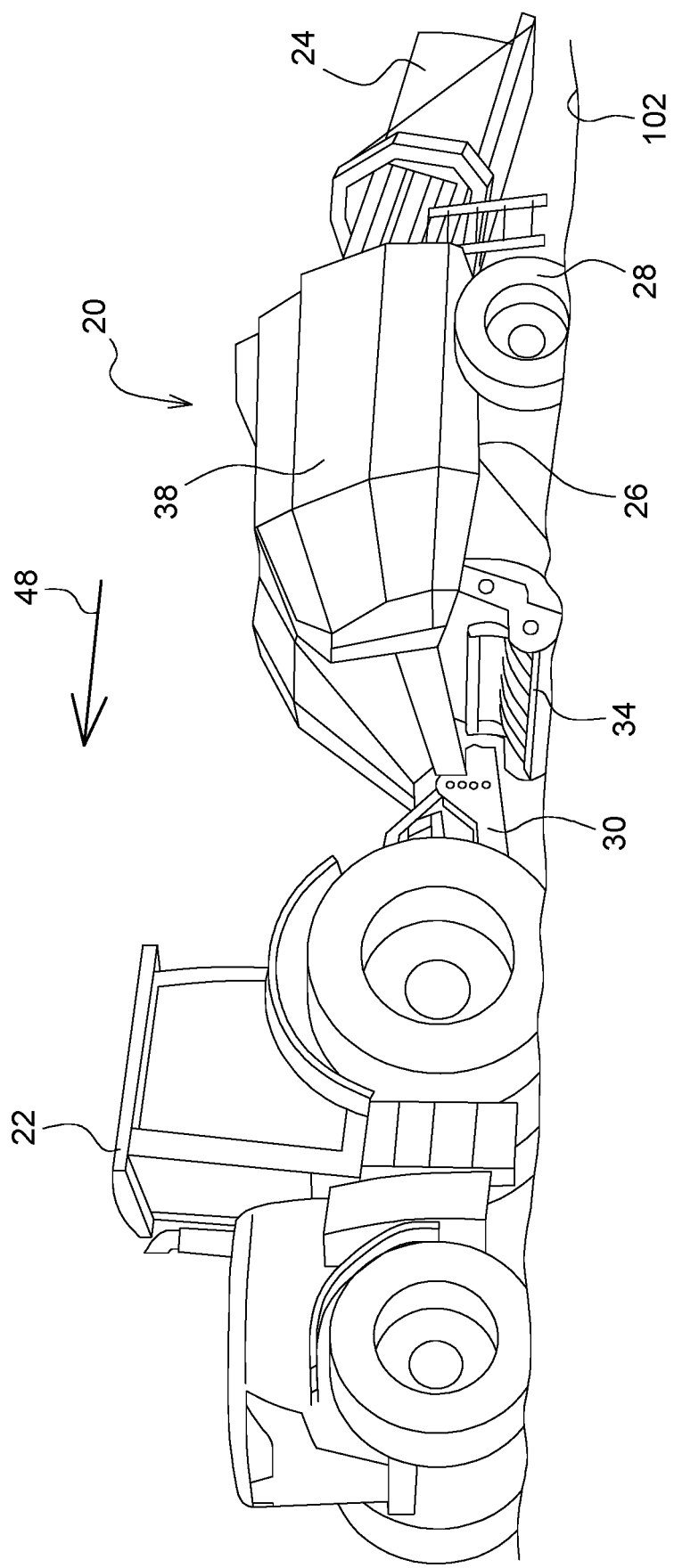
FIG. 1 is a schematic perspective view of a baler drawn by a tractor.

Referring to the Figures, wherein like numerals indicate like parts throughout the several views, a baler implement is generally shown at 20. Referring to FIG. 1 the baler implement 20 is shown as a large square baler. However, it should be appreciated that the teachings of this disclosure may be applied to other baler platforms, and are not limited to the example implementation of the large square baler shown in the Figures and described herein.

As shown in FIG. 1, a vehicle, such as but not limited to a tractor 22, is coupled to the baler implement 20 for pulling and powering the baler implement 20. However, it should be appreciated that in other implementations, the baler implement 20 may be self-propelled. As depicted in FIG. 1, the baler implement 20 may move across a field and gather and process crop material to form a bale 24. The baler implement 20 may then eject the formed bale 24 from the rear of the baler implement 20. In the example implementation shown in the Figures and described herein, the baler implement 20 is configured to form the bale 24 to include a parallelepiped shape, which is often referred to as a large square bale 24. However, it should be appreciated that the baler implement 20 may be configured differently to form the bale 24 to exhibit a different shape.

Figure 2:
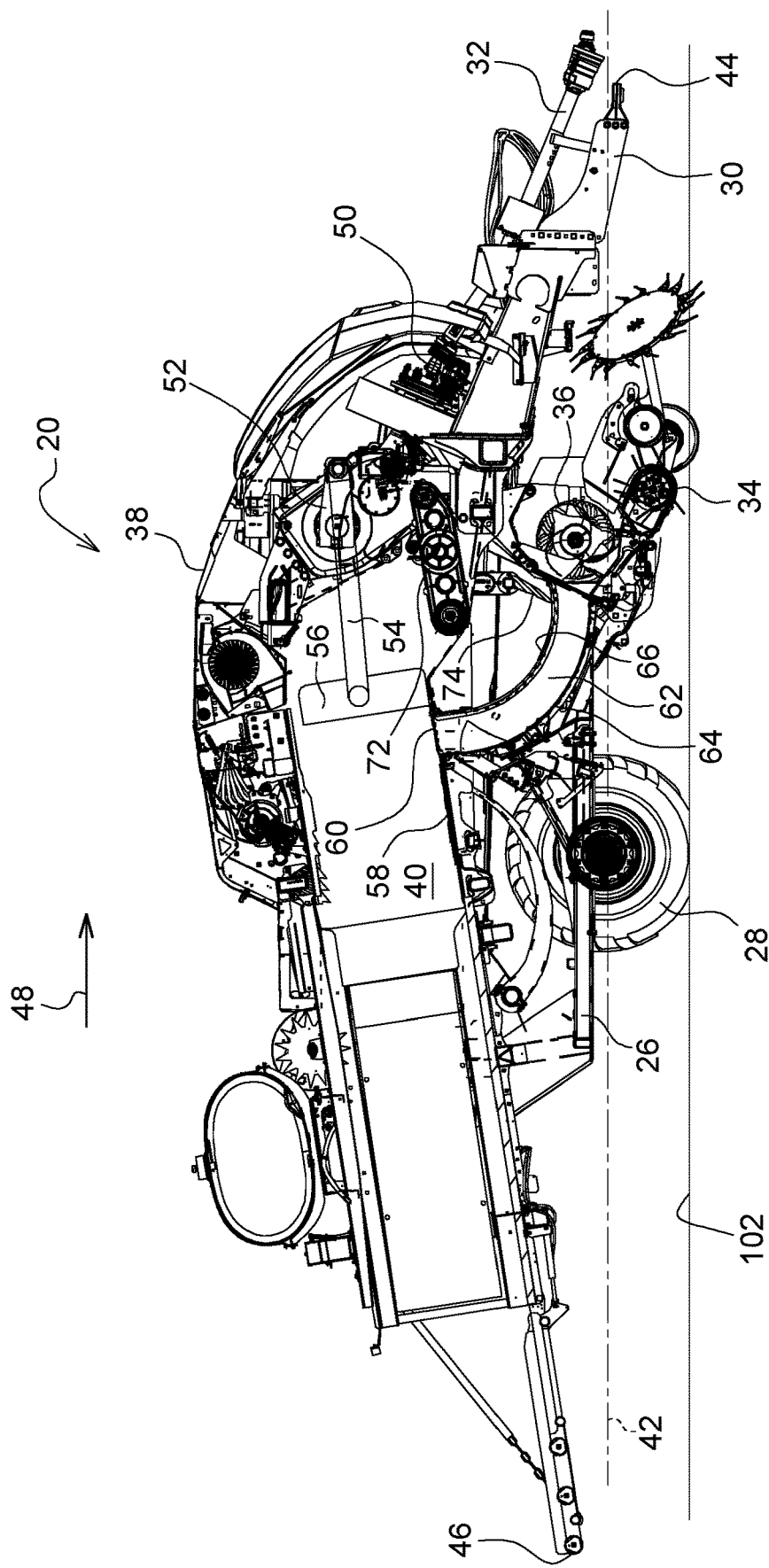
FIG. 2 is a schematic cut-away side view of a baler implement.

Referring to FIG. 2, the example implementation of the baler implement 20 includes a frame 26, ground engaging elements 28, such as but not limited to wheels or tracks, a hitch 30 for attachment to the tractor 22 or other vehicle, and an input shaft 32, such as a power-take-off (PTO) shaft, which can receive rotational power from a power source, such as the tractor 22. The baler implement 20 includes a pick-up 34 which gathers crop material from the ground surface 102 and feeds it into the baler implement 20. The pick-up 34 mechanism may include various pick-up 34 apparatus including, but not limited to, tines, forks 74, augers, conveyors, baffles, a cutter assembly 36, or any combination of the preceding. The baler implement 20 includes a housing 38 or body, which generally shields various internal components of the baler implement 20. The housing 38 includes multiple wall sections that form a compression chamber 40 configured for forming the crop material into the bale 24. The housing 38, which forms the compression chamber 40, extends along a central longitudinal axis 42. The central longitudinal axis 42 extends between a forward end 44 of the frame 26 or housing 38, and a rearward end 46 of the frame 26 or housing 38. As used herein, the term forward and rearward may be interpreted with respect to the direction of travel 48 of the baler implement 20 while gathering crop material.

The input shaft 32 or PTO shaft is connected to an input of a transmission 50 to provide rotational power to the baler implement 20 from the tractor 22 or other associated vehicle or power source. The transmission 50 includes a gearbox which converts the rotational motion of the input shaft 32 along the central longitudinal axis 42 of the baler implement 20 to an output of the transmission 50 having a rotational motion along a generally transverse axis of the baler implement 20. As used herein, the term "transverse" may be interpreted as extending perpendicular to the central longitudinal axis 42 of the baler implement 20, between a left side and a right side of the baler implement 20 relative to the direction of travel 48 of the baler implement 20 while gathering crop material.

The baler implement 20 includes a crank arm 52 connected to the output of the transmission 50. A connecting link 54 interconnects the crank arm 52 and a plunger 56. The crank arm 52 rotates based upon the output of the transmission 50 and the plunger 56 moves in a reciprocal motion within the compression chamber 40 as the crank arm 52 rotates. The plunger 56 extends into the compression chamber 40, thereby compressing the crop material, and then at least partially retracts from the compression chamber 40 to allow more crop material to enter the compression chamber 40.

As described above, the housing 38 includes multiple wall sections that form the compression chamber 40. As such, the housing 38 includes a bottom wall 58 that partially defines a lower boundary of the compression chamber 40. The bottom wall 58 defines a chamber inlet 60, which provides access for moving the crop material into the compression chamber 40.

A pre-compression passageway 62 interconnects the pick-up 34 and the chamber inlet 60. In the example implementation shown in the Figures and described herein, the pre-compression passageway 62 is defined and/or bounded by a lower passage wall 64 and an upper passage wall 66. While not shown in the Figures, it should be appreciated that the pre-compression passageway 62 may further be defined by and/or bounded by a first or left lateral side wall and a second or right lateral side wall. The pre-compression passageway 62 is a generally closed passage having an inlet 68 adjacent to the pick-up 34 for receiving the crop material, and an outlet 70 adjacent the chamber inlet 60 for discharging the crop material through the chamber inlet 60 and into the compression chamber 40. The pre-compression passageway 62 forms a generally arcuate path for moving the crop material rearward and upward relative to the direction of travel 48 of the baler implement 20.

A feed system 72 includes a plurality of forks 74 for moving the crop material through the pre-compression passageway 62 and into the baling chamber. The forks 74 are drivenly coupled to the transmission 50 and are timed with the plunger 56 to move the crop material into the baling chamber when the plunger 56 is retracted. In operation, the forks 74 are staged in an initial or starting position, are inserted into the pre-compression passageway 62 and sweep rearward and upward, pushing the crop material nearer and then into the chamber inlet 60, whereupon the forks 74 are withdrawn from the pre-compression passageway 62 and returned to the initial or starting position for the subsequent cycle.

Figure 3:
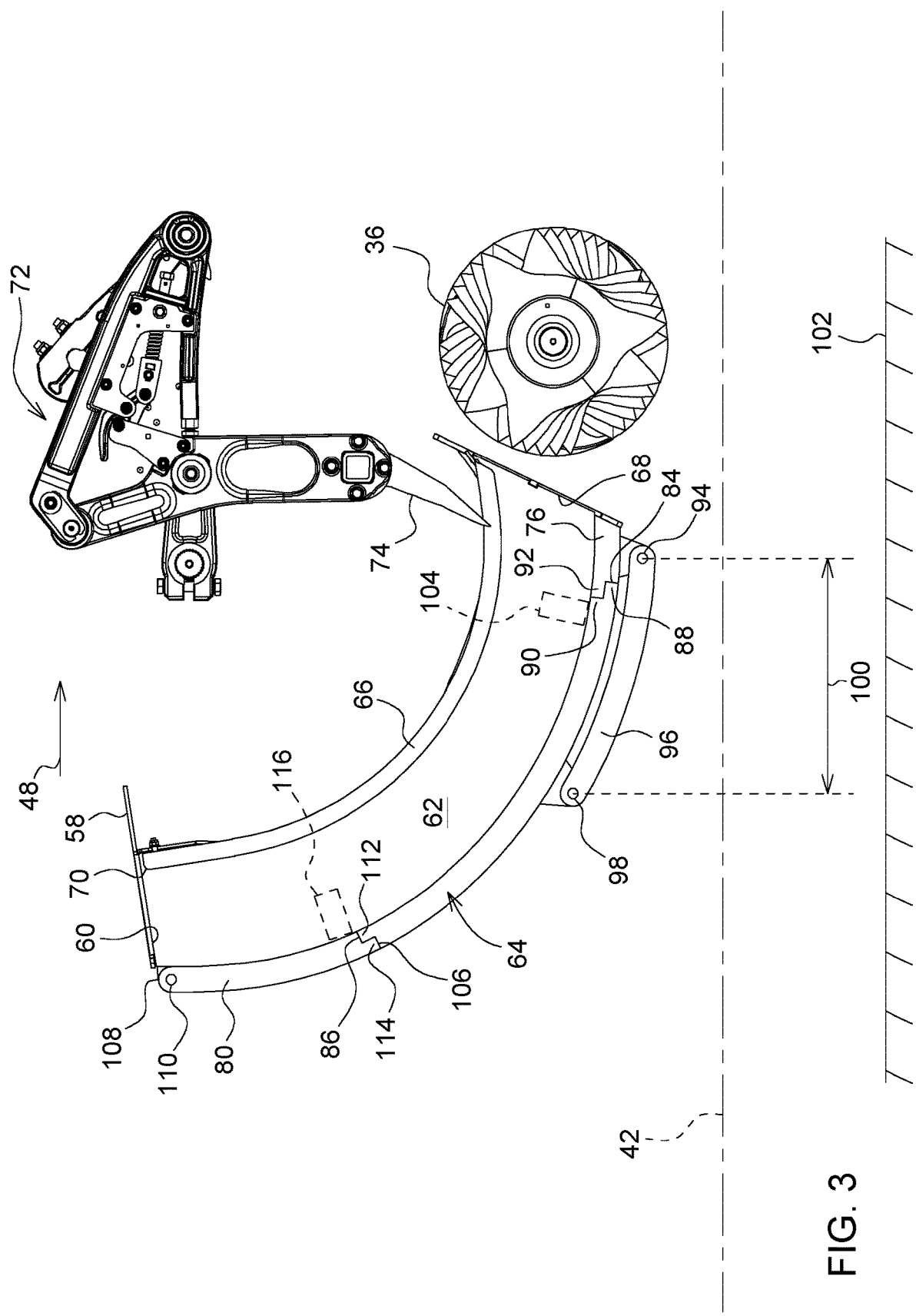
FIG. 3 is a schematic fragmentary cross-sectional side view of the baler implement showing a first implementation of a lower passage wall in an operating position.
Figure 4:
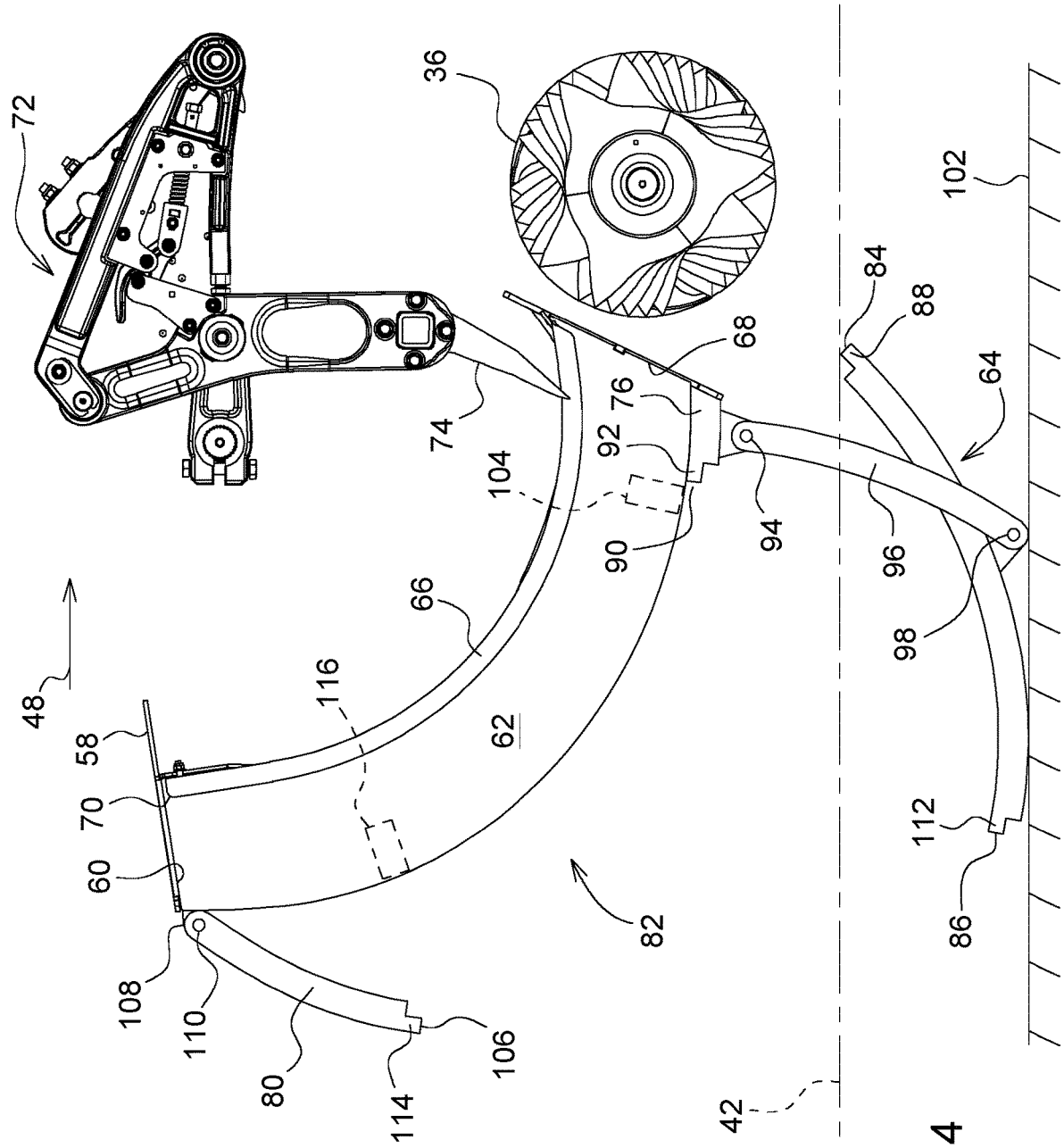
FIG. 4 is a schematic fragmentary cross-sectional side view of the baler implement showing the first implementation of the lower passage wall in an access position.
Figure 5:
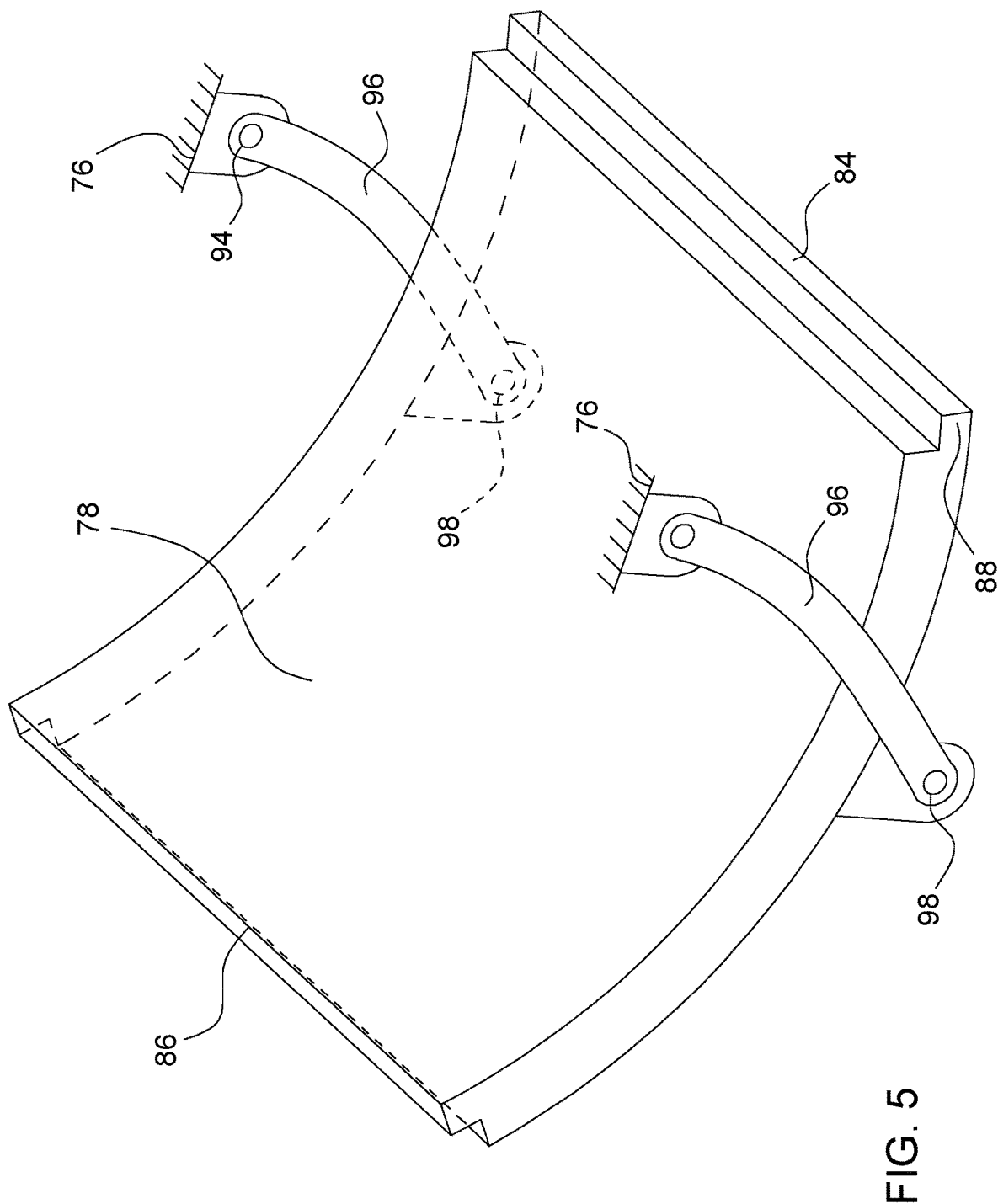
FIG. 5 is a schematic perspective view of the first implementation of the lower passage wall in the access position.

Referring to FIGS. 3-5, the lower passage wall 64 defines a lower and rearward boundary of the pre-compression passageway 62. The lower passage wall 64 includes a forward portion 76, an access panel 78, and a rearward portion 80. The forward portion 76 is positioned proximate the pick-up 34. The access panel 78 is positioned immediately rearward of the forward portion 76. The rearward portion 80 is positioned behind and above the access panel 78 relative to the direction of travel 48 of the baler implement 20. The rearward portion 80 is positioned proximate the chamber inlet 60, with the access panel 78 positioned between the forward portion 76 and the rearward portion 80 along the central longitudinal axis 42.

The access panel 78 is moveable between an operating position and an access position. When the access panel 78 is disposed in the operating position, the access panel 78 is positioned relative to the forward portion 76 and the rearward portion 80 to guide the crop material from the pick-up 34 to the chamber inlet 60. When the access panel 78 is disposed in the access position, the access panel 78 is positioned relative to the forward portion 76 and the rearward portion 80 to provide access to the pre-compression passageway 62 through an opening 82. As such, when disposed in the access position, the access panel 78 is moved relative to the forward portion 76 and the rearward portion 80 to expose the opening 82 into the pre-compression passageway 62.

The access panel 78 includes a first transverse edge 84 and a second transverse edge 86. The first transverse edge 84 is positioned forward of the second transverse edge 86 relative to the forward end 44 of the housing 38. When the access panel 78 is disposed in the operating position, the first transverse edge 84 is positioned vertically below the second transverse edge 86 relative to an elevation of the bottom wall 58 of the housing 38.

In the example implementations shown in the Figures and described herein, the first transverse edge 84 of the access panel 78 defines an exterior lip 88. A rear transverse edge 90 of the first portion of the lower passage wall 64 defines an interior lip 92. The interior lip 92 of the forward portion 76 is positioned inward of the exterior lip 88 of the access panel 78 relative to the pre-compression passageway 62.

In the example implementations shown in the Figures and described herein, the access panel 78 is attached to the forward portion 76 by a pivotable connection 94. While the example implementations show the pivotable connection 94 interconnecting the forward portion 76 and the access panel 78, it should be appreciated that the pivotable connection 94 may attach the access panel 78 to some other portion or structure of the baler implement 20. The pivotable connection 94 is disposed proximate the first transverse edge 84 of the access panel 78 such that the second transverse edge 86 of the access panel 78 moves vertically relative to the elevation of the bottom wall 58 as the access panel 78 moves between the operating position and the access position. By positioning the pivotable connection 94, which attaches the access panel 78 to the baler implement 20, near the first transverse edge 84 of the access panel 78, the second transverse edge 86, i.e., the rearward edge, of the access panel 78 moves or rotates downward and away from the upper passage wall 66. This movement provides access into the pre-compression passageway 62 from the rear of the baler implement 20 and between the second transverse edge 86 of the access panel 78 and the bottom wall 58 of the housing 38. By moving the access panel 78 into the access position in the above described manner, an operator may gain access into the pre-compression passageway 62 without the access panel 78 hanging down from the bottom wall 58 of the housing 38 and partially blocking the opening 82 into the pre-compression passageway 62.

Referring to FIGS. 3-5, a first implementation of the lower passage wall 64 is generally shown. The first implementation of the lower passage wall 64 includes the pivotable connection 94 having a linkage system. The linkage system includes the pivotable connection 94, a pivot link 96, and a second pivotal connection 98. The second pivotable connection 94 is positioned rearward of the pivotable connection 94, relative to the central longitudinal axis 42, and interconnects the access panel 78 and the pivot link 96. The pivot link 96 is further attached to the pivotal connection. As such, the pivot link 96 interconnects the pivotable connection 94 and the second pivotable connection 94.

The second pivotable connection 94 is positioned rearward of the pivotable connection 94 a link distance 100 relative to the forward end 44 of the housing 38. The link distance 100 may be defined to equal a distance that approximates a distance between the pivotable connection 94 and the ground surface 102, such that when the access panel 78 is disposed in the access position, the access panel 78 substantially rests flat on the ground surface 102.

A forward latch 104 may be positioned proximate the first transverse edge 84 of the access panel 78. The forward latch 104 may interconnect the access panel 78 and a component of the baler implement 20, such as the housing 38, the first lateral side wall, or the second lateral side wall. When the access panel 78 is disposed in the operating position, the forward latch 104 is operable to secure the access panel 78 to the housing 38, with the interior lip 92 of the forward portion 76 and the exterior lip 88 of the access panel 78 disposed in overlapping and/or interlocking engagement.

The forward latch 104 may include a latch system that is selectively controllable between a latched position and an un-latched position. The forward latch 104 may be manually operable, or may be remotely operable via a controller and/or a control signal. For example, the forward latch 104 may include an over-center lever actuated latch system that is manually operated, an electrically actuated latch linear latch, or some other similar and/or equivalent latch system. The specific type, structure, feature, and operation of the forward latch 104 are not pertinent to the teachings of this disclosure, are appreciated by those skilled in the art, and are therefor not described in greater detail herein.

The rearward portion 80 of the lower passage wall 64 includes a lower transverse edge 106 and an upper transverse edge 108. When the access panel 78 is disposed in the operating position, the lower transverse edge 106 is positioned adjacent the second traverse edge of the access panel 78. The upper transverse edge 108 is positioned adjacent to the bottom wall 58 of the housing 38 and proximate to the chamber inlet 60.

Referring to FIGS. 3-5, the first implementation of the lower passage wall 64 includes the upper transverse edge 108 of the rearward portion 80 rotatably attached to the housing 38 or some other component of the baler implement 20 for rotational movement about a pivot location 110 relative to the housing 38. As such, the rearward portion 80 is rotatable fore and aft relative to the housing 38.

When the access panel 78 is positioned in the operating position, the lower transverse edge 106 of the rearward portion 80 and the second transverse edge 86 of the access panel 78 are disposed in interlocking engagement. In the example implementation shown in FIGS. 3-5, the second transverse edge 86 of the access panel 78 defines an inner lip 112 and the lower transverse edge 106 of the rearward portion 80 defines an outer lip 114. The inner lip 112 of the access panel 78 is positioned inward of the outer lip 114 of the rearward portion 80 relative to the pre-compression passageway 62.

The first implementation of the lower passage wall 64 shown in FIGS. 3-5 includes a rearward latch 116. The rearward latch 116 may interconnect the rearward portion 80 and a component of the baler implement 20, such as the housing 38, the first lateral side wall, or the second lateral side wall. When the access panel 78 is disposed in the operating position, the rearward latch 116 is operable to secure the rearward portion 80 relative to the housing 38, with the inner lip 112 of the access panel 78 and the outer lip 114 of the portion disposed in overlapping and/or interlocking engagement.

The rearward latch 116 may include a latch system that is selectively controllable between a latched position and an un-latched position. The rearward latch 116 may be manually operable, or may be remotely operable via a controller and/or a control signal. For example, the rearward latch 116 may include an over-center lever actuated latch system that is manually operated, an electrically actuated latch linear latch, or some other similar and/or equivalent latch system. The specific type, structure, feature, and operation of the rearward latch 116 are not pertinent to the teachings of this disclosure, are appreciated by those skilled in the art, and are therefore not described in greater detail herein.

Figure 6:
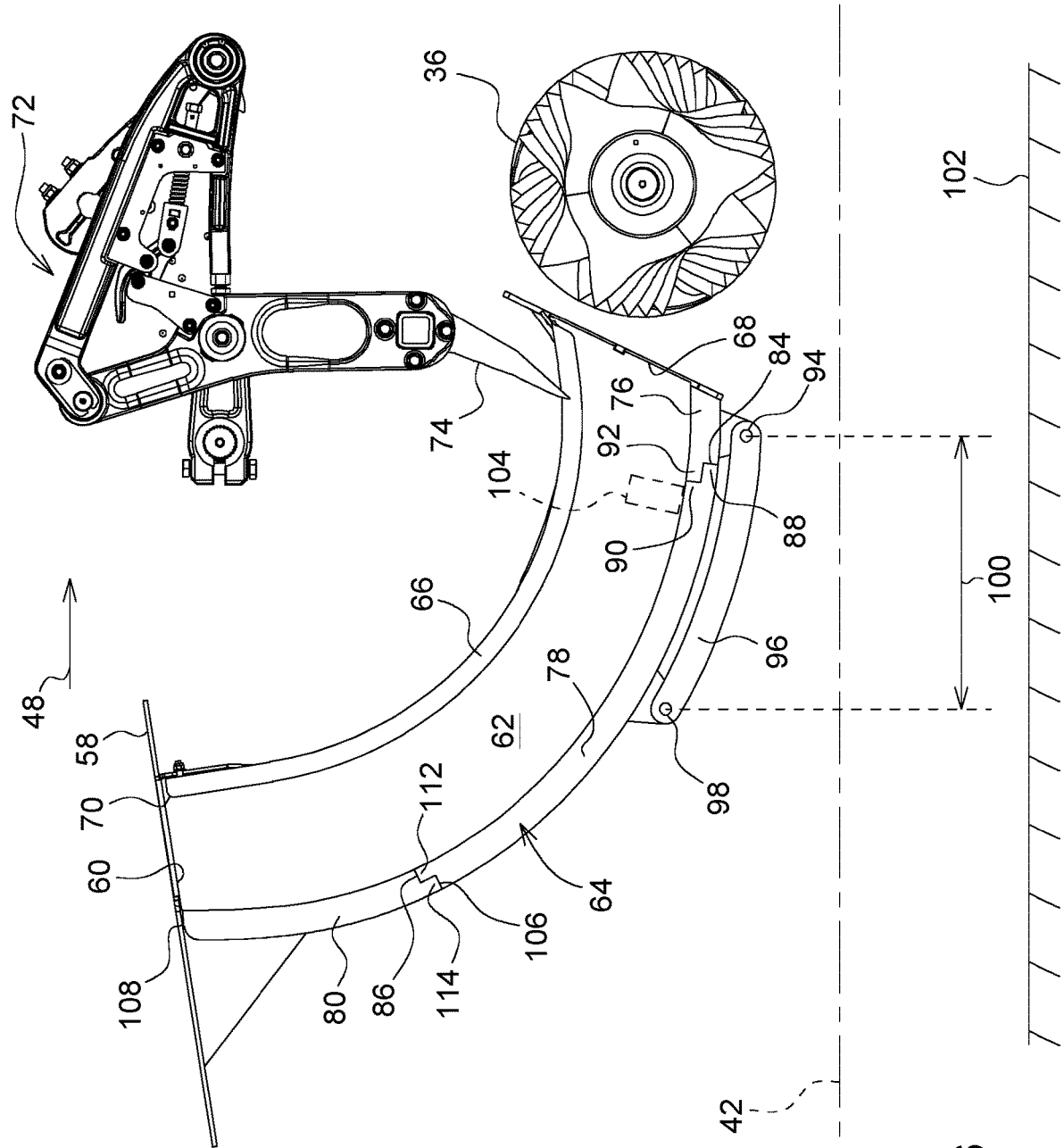
FIG. 6 is a schematic fragmentary cross-sectional side view of the baler implement showing a second implementation of the lower passage wall in the operating position.

Referring to FIG. 6, a second implementation of the lower passage wall 64 is generally shown. The second implementation of the lower passage wall 64 shown in FIG. 6 is similar to the first implementation of the lower passage wall 64 of FIGS. 3-5. The second implementation of the lower passage wall 64 shown in FIG. 6 differs in that the rearward portion 80 of the lower passage wall 64 is fixedly and non-rotatably attached to the housing 38 or some other component of the baler implement 20. Because the rearward portion 80 is not rotatable relative to the housing 38, the rearward latch 116 is not required to secure the position of the rearward portion 80 in the operation position.

Figure 7:
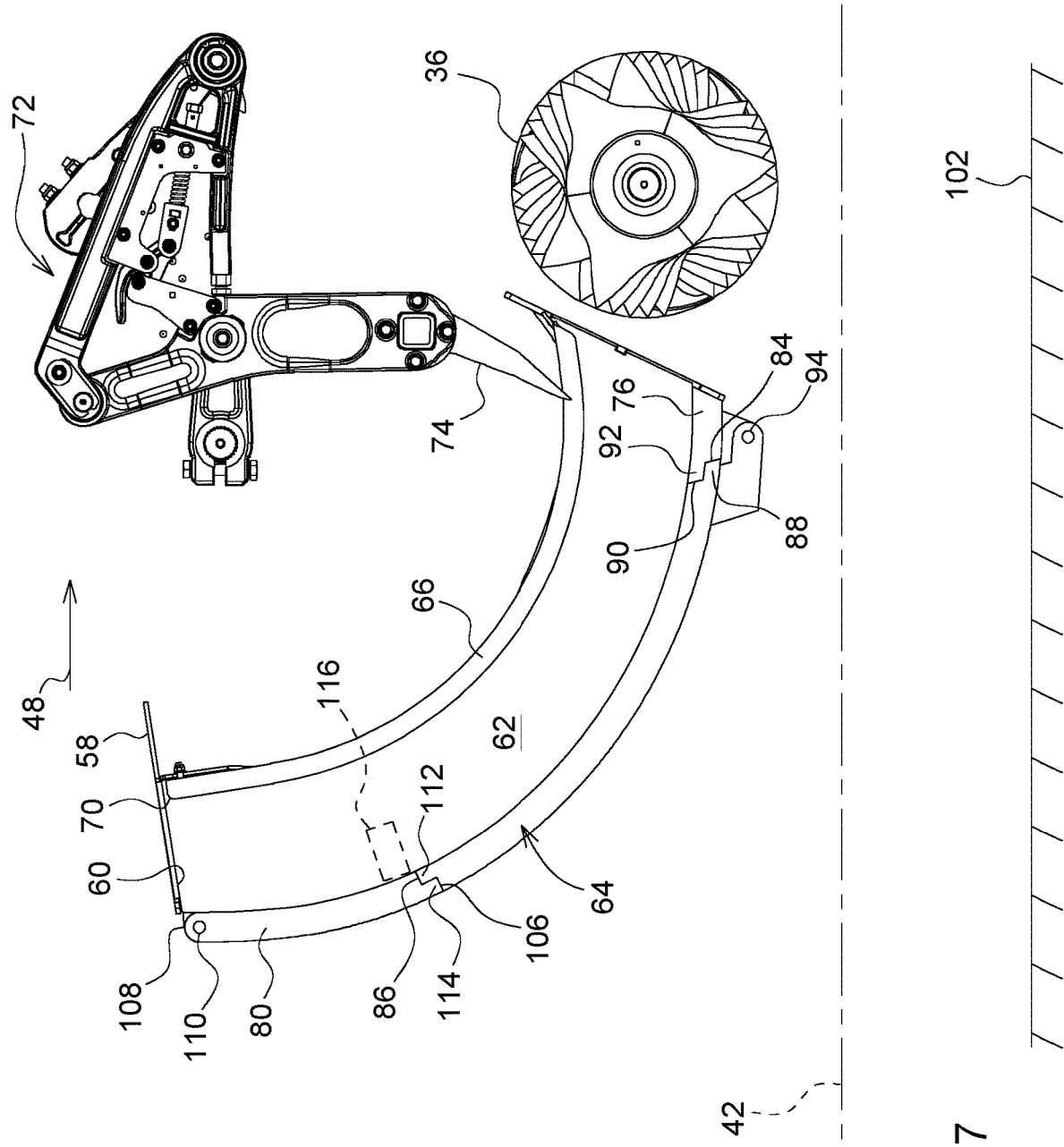
FIG. 7 is a schematic fragmentary cross-sectional side view of the baler implement showing a third implementation of the lower passage wall in the operating position.
Figure 8:
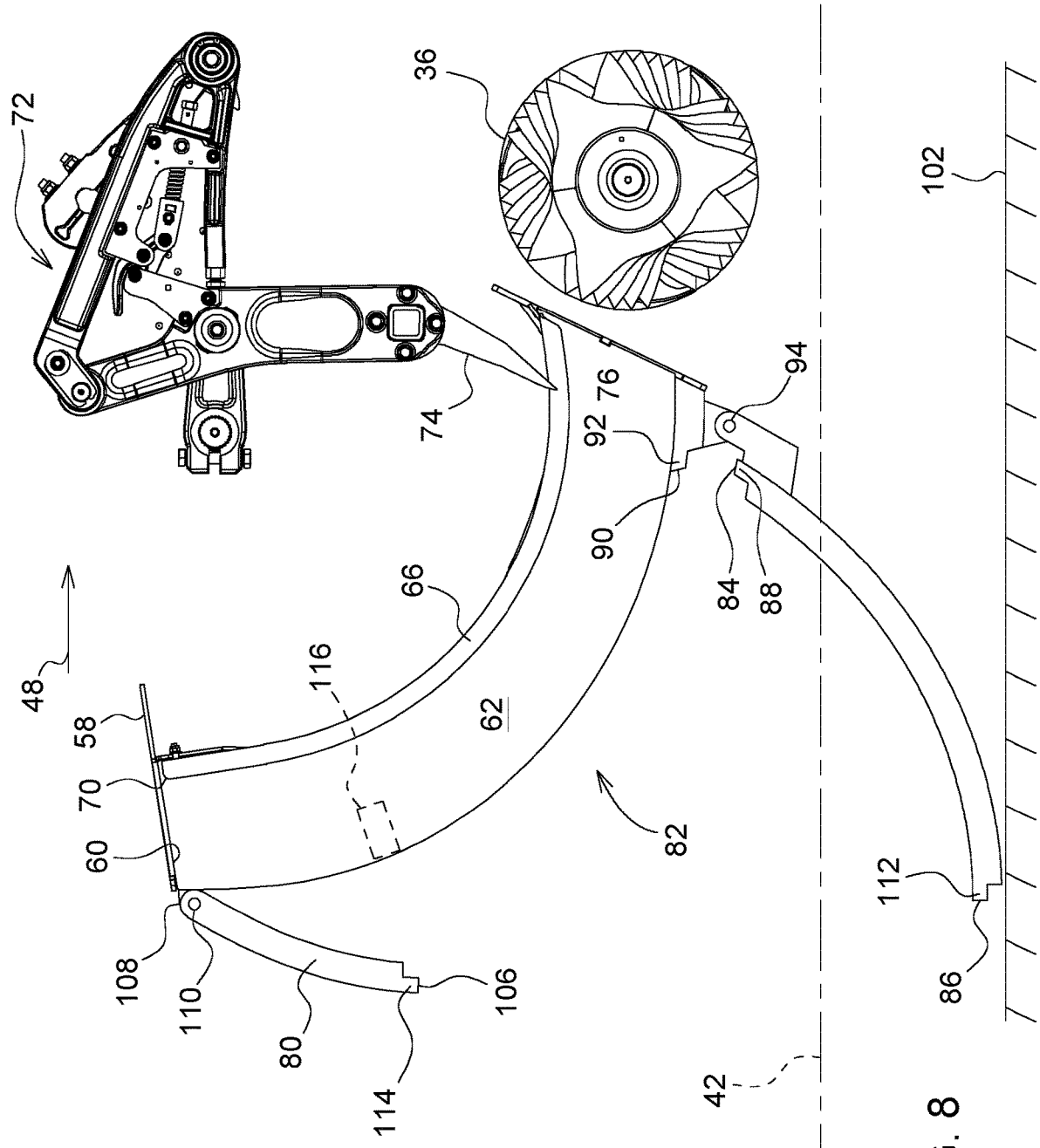
FIG. 8 is a schematic fragmentary cross-sectional side view of the baler implement showing the third implementation of the lower passage wall in the access position.

Referring to FIGS. 7-8, a third implementation of the lower passage wall 64 is generally shown. The third implementation of the lower passage wall 64 shown in FIGS. 7-8 is similar to the first implementation of the lower passage wall 64 of FIGS. 3-5. The third implementation of the lower passage wall 64 shown in FIGS. 7-8 differs in that the pivotable connection 94 directly attaches the access panel 78 to the forward portion 76 of the lower passage wall 64. As such, the third implementation of the lower passage wall 64 does not include the pivot link 96 and the second pivotal connection 98 shown in the first implementation of FIGS. 3-5.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A baler implement comprising:
a pick-up operable to gather and move crop material;
a housing extending along a central longitudinal axis between a forward end and a rearward end, the housing including a bottom wall partially defining a compression chamber, the bottom wall defining a chamber inlet;
a lower passage wall defining a lower boundary of a pre-compression passageway interconnecting the pick-up and the chamber inlet, the lower passage wall including an access panel moveable between an operating position for guiding crop material from the pick-up to the chamber inlet and an access position for providing access to the pre-compression passageway;
wherein the access panel includes a first transverse edge and a second transverse edge, with the first transverse edge positioned forward of the second transverse edge relative to the forward end of the housing, with the first transverse edge positioned vertically below the second transverse edge relative to an elevation of the bottom wall of the housing when the access panel is disposed in the operating position, and with the second transverse edge positioned vertically below the first transverse edge relative to the elevation of the bottom wall of the housing when the access panel is disposed in the access position; and
a pivotable connection supporting the access panel and configured such that the second transverse edge of the access panel moves vertically relative to the elevation of the bottom wall as the access panel moves between the operating position and the access position to provide access into the pre-compression passageway,
wherein when the access panel is moved to the access position, the first transverse edge and the second transverse edge are moved downward away from the pivotable connection.

2. The baler implement set forth in claim 1, wherein the pivotable connection is disposed proximate the first transverse edge of the access panel.

3. The baler implement set forth in claim 1, wherein the lower passage wall includes a forward portion positioned proximate the pick-up.

4. The baler implement set forth in claim 3, wherein the lower passage wall includes a rearward portion positioned proximate the chamber inlet, with the access panel positioned between the forward portion and the rearward portion along the central longitudinal axis.

5. The baler implement set forth in claim 4, wherein the rearward portion of the lower passage wall includes a lower transverse edge positioned adjacent the second traverse edge of the access panel when the access panel is disposed in the operating position, and an upper transverse edge positioned adjacent to the bottom wall and proximate to the chamber inlet.

6. The baler implement set forth in claim 5, wherein the lower transverse edge of the rearward portion and the second transverse edge of the access panel are disposed in interlocking engagement when the access panel is positioned in the operating position.

7. The baler implement set forth in claim 6, wherein the second transverse edge of the access panel defines an inner lip and the lower transverse edge of the rearward portion defines an outer lip, with the inner lip positioned inward of the outer lip relative to the pre-compression passageway.

8. The baler implement set forth in claim 5, wherein the upper transverse edge of the rearward portion is rotatably attached to the housing for rotational movement relative to the housing.

9. The baler implement set forth in claim 4, wherein the rearward portion is non-moveable relative to the housing.

10. The baler implement set forth in claim 4, further comprising a rearward latch interconnecting the rearward portion of the lower passage wall and the housing, with the rearward latch operable to secure the rearward portion relative to the housing when the access panel is disposed in the operating position.

11. The baler implement set forth in claim 1, wherein the first transverse edge of the access panel defines an exterior lip and a rear transverse edge of a first portion of the lower passage wall defines an interior lip, with the interior lip positioned inward of the exterior lip relative to the pre-compression passageway.

12. The baler implement set forth in claim 1, further comprising a forward latch positioned proximate the first transverse edge of the access panel and interconnecting the access panel and the housing, with the forward latch operable to secure the access panel to the housing when the access panel is disposed in the operating position.

13. The baler implement set forth in claim 1, wherein the pivotable connection includes a pivot link interconnecting the pivotable connection and the access panel.

14. The baler implement set forth in claim 13, further comprising a second pivotable connection positioned rearward of the pivotable connection relative to the central longitudinal axis a link distance, wherein the second pivotable connection interconnects the pivot link and the access panel.

15. The baler implement set forth in claim 14, wherein the second pivotable connection is spaced rearward of the pivotable connection a link distance relative to the forward end of the housing.

* * * * *